United States Patent
Fischer (10) Patent No.: US 11,524,409 B2
(45) Date of Patent: Dec. 13, 2022

(54) METHOD AND DEVICE FOR EFFICIENTLY ASCERTAINING OUTPUT SIGNALS OF A MACHINE LEARNING SYSTEM

(71) Applicant: Robert Bosch GmbH, Stuttgart (DE)

(72) Inventor: Volker Fischer, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 430 days.

(21) Appl. No.: 16/639,766

(22) PCT Filed: Aug. 2, 2018

(86) PCT No.: PCT/EP2018/071044
§ 371 (c)(1),
(2) Date: Feb. 18, 2020

(87) PCT Pub. No.: WO2019/038050
PCT Pub. Date: Feb. 28, 2019

(65) Prior Publication Data
US 2020/0206939 A1    Jul. 2, 2020

(30) Foreign Application Priority Data

Aug. 21, 2017  (DE) .......................... 102017214524.2
Jun. 12, 2018  (DE) .......................... 102018209316.4

(51) Int. Cl.
*G06N 3/04*    (2006.01)
*B25J 9/16*    (2006.01)

(52) U.S. Cl.
CPC ............. *B25J 9/1697* (2013.01); *B25J 9/161* (2013.01); *G06N 3/04* (2013.01); *G06N 3/0445* (2013.01); *G06N 3/0454* (2013.01)

(58) Field of Classification Search
CPC ...... G06V 20/58; G06V 10/82; G06K 9/6271; G06N 3/0445
See application file for complete search history.

(56) References Cited

U.S. PATENT DOCUMENTS

| | | | |
|---|---|---|---|
| 2013/0184860 A1* | 7/2013 | Ota | B25J 9/1612 700/245 |
| 2014/0136455 A1* | 5/2014 | Cheng | G05B 15/02 700/20 |
| 2019/0065677 A1* | 2/2019 | Gifford | G06N 3/08 |

OTHER PUBLICATIONS

International Search Report for PCT/EP2018/071044, dated Nov. 20, 2018.
Michiel Hermans et al., "Training and Analyzing Deep Recurrent Neural Networks", Neural Information Processing Systems 2013, 2013, XP055347016.
Pranv, "Parallel Unrolling of Stacked Recurrent Neural Networks", 2017, pp. 1-2, XP055522354.

(Continued)

*Primary Examiner* — Sam Bhattacharya
(74) *Attorney, Agent, or Firm* — Norton Rose Fulbright US LLP; Gerard Messina (57) ABSTRACT

A method for efficiently ascertaining output signals of a sequence of output signals with the aid of a sequence of layers of a machine learning system, in particular a neural network, from a sequence of input signals. The neural network is supplied in succession with the input signals of the sequence of input signals in a sequence of discrete time increments. At the discrete time increments, signals present in the network are in each case further propagated through a layer of the sequence of layers.

21 Claims, 6 Drawing Sheets

(56) References Cited

OTHER PUBLICATIONS

Jeff Donahue et al., "Long-Term Recurrent Convolutional Networks for Visual Recognition and Description", ARXIV: 1411.4389V4 [CS.CV], 2016, XP055470689.

Lu Chi et al., "Deep Steering: Learning End-To-End Driving Model From Spatial and Temporal Visual Cues", 2017, pp. 1-12, XP055523423.

Favaro, Paolo., "Advanced Topics in Machine Learning", Week 12-13—Deep Recurrent Neutral Networks, 2017, pp. 1-49. URL: http://www.cvg.unibe.ch/teaching/repository/atml/a [Abgerufen AM 19.02.20181].

Recurr Neutral Network. In: Wikipedia, The Free Encyclopedia. Bearbeitungsstand, 2017. URL: https://en.wikipedia.org/w/index.php?title=recurrent_neutral_network&oldid=795590475 [Abgerufen AM Feb. 19, 2018].

Iqbal, Ahsan [U. A.], "Recurrent Rresidual Learning for Action Recognition. In: Computing Research Repository (CORR)", 2017, pp. 1-12. https://arxiv.org/abs/1706.08807V1[Abgerufen AM Feb. 19, 2018].

Soltani, Rohollah et al., "Higer Order Recurrent Neural Networks. In: Computing Research Repository (CORR)", 2016, pp. 1-9. https://arxiv.org/abs/1605.00064V1[Abgerufen AM Feb. 19, 2018].

\* cited by examiner

METHOD AND DEVICE FOR EFFICIENTLY ASCERTAINING OUTPUT SIGNALS OF A MACHINE LEARNING SYSTEM

FIELD OF THE INVENTION

The present invention relates to a method for efficiently ascertaining output signals of a machine learning system, a measuring system, an actuator control system in which the method is used, a computer program, and a machine-readable memory medium.

BACKGROUND INFORMATION

A method is discussed in U.S. Pat. No. 5,448,484 A for recognizing the presence of a vehicle in a traffic scenario by use of a neural network. The neural network includes input units, concealed units, and output units, an output of each of the stated input units being connected to an input of each of the concealed units, and an output of each of the concealed units being connected to an input of each of the output units. The neural network generates an output signal at each of the output units which indicates whether a vehicle has been detected in a detection zone.

SUMMARY OF THE INVENTION

The method having the features described herein has the advantage over the related art that it may be carried out in parallel in a particularly efficient manner.

In a first aspect, the present invention relates to a method for efficiently ascertaining output signals of a sequence of output signals with the aid of a sequence of layers of a machine learning system, in particular a neural network, from a sequence of input signals, the neural network being supplied in succession with the input signals of the sequence of input signals in a sequence of discrete time increments, and at the discrete time increments, signals present in the network in each case being further propagated through a layer of the sequence of layers.

This means that at any point in time, the neural network is supplied with new input signals, and in particular while the previous input signals are being propagated by the neural network.

This method has the advantage that the computing operations required for propagation through the particular layers may be parallelized with particularly good memory efficiency. In addition, an initialization of the neural network is particularly simple, since it need take place only once, and does not have to be carried out anew for each of the input signals.

Input signals and/or output signals may be one- or multidimensional variables, as is customary.

In one particular aspect, the method is therefore carried out on a computer with a plurality of processing units, for example a plurality of independently operable processors or processor cores.

In one refinement, it is provided that at the discrete time increments, all signals present in the network are in each case further propagated through a layer of the sequence of layers.

This means that each layer of the sequence of layers ascertains its particular output signal as a function of the input signals that are present on the layer, and passes this output signal also on to each of the subsequent layers, which receive this output signal as an input signal.

Such a method may be parallelized with particularly good memory efficiency.

In another aspect, it may be provided that at one of the discrete time increments, at the input of a layer that is expecting from a preceding layer a signal that is not yet present, i.e., a signal whose computation is not yet concluded, a signal that is present at a preceding, in particular immediately preceding, point in time is applied.

This means that it is provided that when the propagation of a signal through a layer lasts longer than the duration of a time slice between successive time increments, instead of this propagated signal, a prior signal propagated through this layer at an earlier point in time is used. This makes it possible in particular to select the time slices to be smaller than a maximum computation time for the layers. The computation may thus take place particularly quickly.

In one refinement, it may be provided that for layers, in each case a fixed number of time pulses is predefinable, within which the propagation of signals through this layer is completed with certainty, and after the predefinable number of time pulses, a signal that is newly propagated through this layer is applied in each case at the layer output, and is present there for the predefinable number of time pulses.

This is a particularly simple way to make the computation deterministic in order to prevent variations in the computation time resulting in a different further propagation of signals.

In another particular aspect, it may be provided that the machine learning system includes at least one recurrent layer.

With such a recurrent layer, the signals present at their inputs, which have been derived from different input signals of the sequence of input signals, mix at their output. In this way, a sequence of input signals that are built up in succession, such as images of a video sequence, is thus analyzable in a particularly simple manner.

In yet another aspect, it may be provided that at each of the discrete time increments, the computation steps associated with different layers are associated with different processing units. Partial or complete parallelization of the computing operations is thus achieved during the propagation of the signals.

One of the above-mentioned methods may advantageously be used when the input signals from the sequence of input signals have been ascertained with the aid of a sensor, in particular an imaging sensor.

In another advantageous refinement, it may alternatively or additionally be provided that an actuator is controlled as a function of the sequence of output signals.

In another aspect, the present invention relates to a measuring system that includes the sensor, in particular the imaging sensor, with the aid of which the sequence of input signals is ascertained, and one or multiple processors and at least one machine-readable memory medium on which instructions are stored, which, when executed on the processors, prompt the measuring system to carry out one of the methods mentioned above.

In yet another aspect, the present invention relates to an actuator control system for controlling the actuator, including one or multiple processors and at least one machine-readable memory medium on which instructions are stored, which, when executed on the processors, prompt the actuator control system to ascertain the sequence of output signals using one of the methods mentioned above, and to control the actuator as a function of the sequence of output signals.

In further aspects, the present invention relates to a computer program that is configured for carrying out one of the above-mentioned methods when it is executed on a computer, and a machine-readable memory medium on which this computer program is stored (it being possible, of course, for this memory medium to be spatially distributed, for example distributed over multiple computers in a parallel configuration).

Specific embodiments of the present invention are explained in greater detail below with reference to the appended drawings.

DETAILED DESCRIPTION

Figure 1:
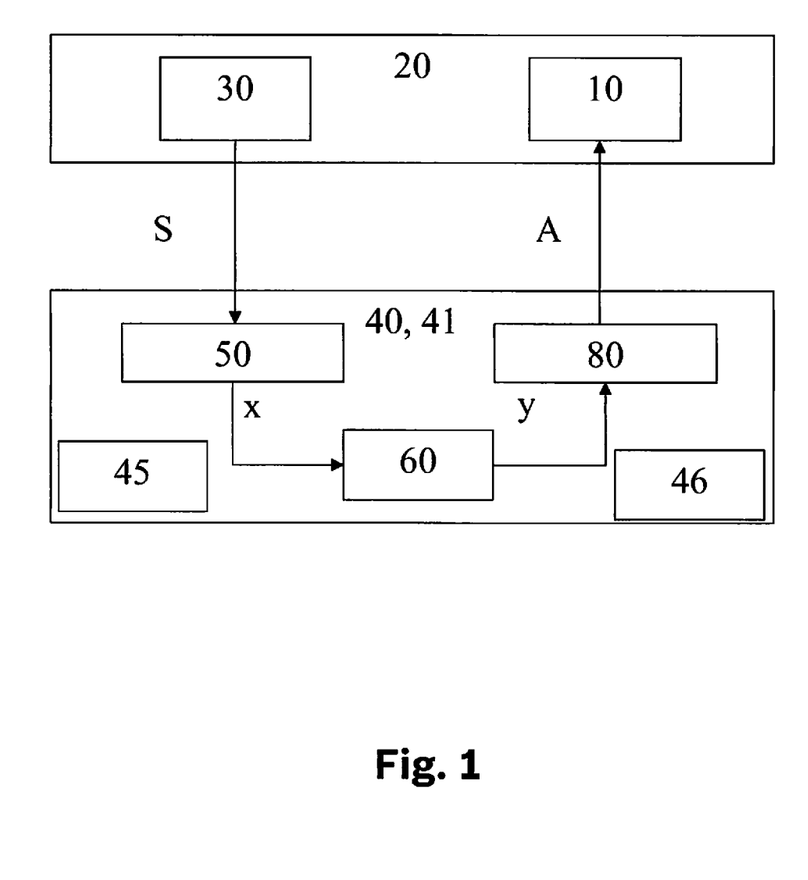
FIG. 1 schematically shows application options of the present invention.

FIG. 1 shows an actuator 10 in its surroundings 20 in interaction with an actuator control system 40. Actuator 10 and surroundings 20 are also collectively referred to below as an actuator system. A state of the actuator system is detected at regular time increments via a sensor 30, which may also be provided by a plurality of sensors. One sensor signal S each of sensor 30 is transmitted to actuator control system 40. Actuator control system 40 thus receives a sequence of sensor signals S. Actuator control system 40 ascertains therefrom a sequence of actuating signals A which is received by actuator 10.

Actuator 10 may be, for example, a (semi)autonomous robot, such as a (semi)autonomous motor vehicle. Sensor 30 may be, for example, one or multiple video sensors and/or one or multiple radar sensors and/or one or multiple ultrasonic sensors and/or one or multiple position sensors (GPS, for example). Alternatively or additionally, sensor 30 may include an information system that ascertains information concerning a state of the actuator system, for example a weather information system that ascertains a present or future state of the weather in surroundings 20.

In another exemplary embodiment, the robot may be a manufacturing robot, and sensor 30 may then be an optical sensor, for example, that detects properties of products manufactured by the manufacturing robot.

In another exemplary embodiment, actuator 10 may be an enabling system that is configured for enabling or not enabling the activity of a device. Sensor 30 may be, for example, an optical sensor (for detecting image data or video data, for example) that is configured for detecting a face. Actuator 10 ascertains an enabling signal, based on the sequence of actuating signals A, which may be used to enable the device as a function of the value of the enabling signal. The device may be a physical or logical access control, for example. As a function of the value of actuating signal A, the access control may then provide that access is granted or not granted.

Actuator control system 40 receives the sequence of sensor signals S of the sensor in an optional receiving unit 50 which converts the sequence of sensor signals S into a sequence of input signals x (alternatively, each sensor signal S may also be directly accepted as an input signal x). Input signal x may, for example, be a segment or further processing of sensor signal S. Input signal x is supplied to a machine learning system 60, for example a neural network.

First machine learning system 60 ascertains output signals y from input signals x. Output signals y are supplied to an optional conversion unit 80, which from the output signals ascertains actuating signals A which are supplied to actuator 10.

A measuring system 41 is also illustrated in FIG. 1. The measuring system differs from actuator control system 40 solely in that optional conversion unit 80 does not ascertain an actuating signal A. The conversion unit may, for example, store or display output signal y, for example as a visual or auditory signal.

In other specific embodiments, actuator control system 40 and/or measuring system 41 include(s) sensor 30.

In yet other specific embodiments, actuator control system 40 alternatively or additionally includes actuator 10.

In other specific embodiments, actuator control system 40 and/or measuring system 41 include(s) one or multiple processors 45 and at least one machine-readable memory medium 46 on which instructions are stored, which, when executed on processors 45, prompt actuator control system 40 and/or measuring system 41 to carry out a method according to the present invention.

Figure 2:
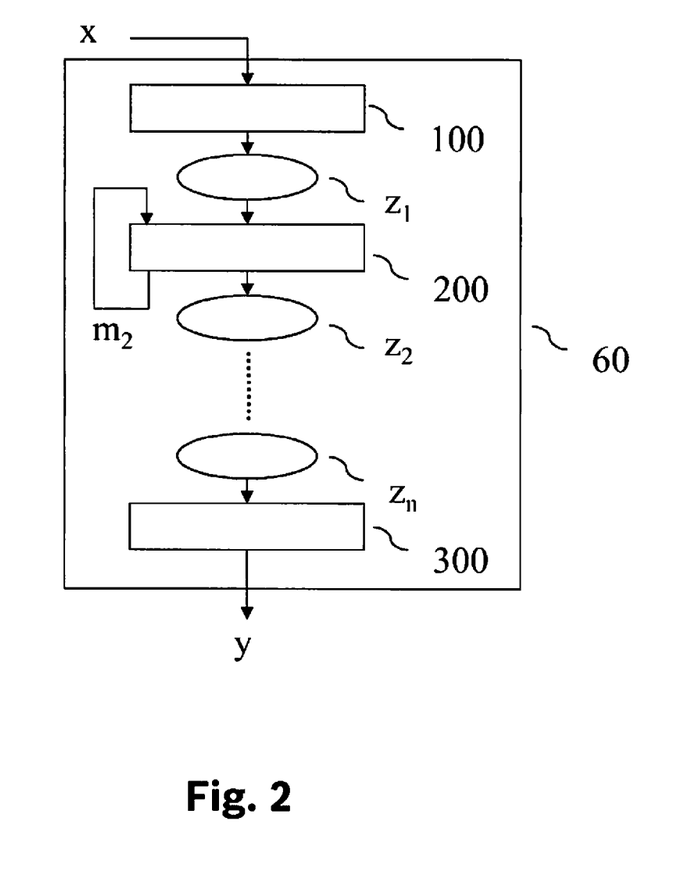
FIG. 2 shows an example of a neural network, which when executed allows the present invention to be used.

FIG. 2 illustrates the configuration of a machine learning system 60 which is structured in layers, and which in the exemplary embodiment is provided by a neural network. Input signal x is supplied to an input layer 100, which, in particular with the aid of linear or nonlinear transformation, ascertains from signal x a signal $z_1$, which is supplied to a concealed layer 200. Intermediate layer 200 ascertains from signal $z_1$ a further signal $z_2$, which optionally is supplied to further subsequent concealed layers, which, analogously to concealed layer 200, ascertain further signals $z_i$. The last of these signals $z_n$ is supplied to an output layer 300, which ascertains output signal y from signal $z_n$. Intermediate layer 200 may have a recurrent configuration, for example, as the result of optional further signal $m_2$. The successive layer-by-layer processing of input signal x is also known as propagation of input signal x through neural network 60.

Figure 3:
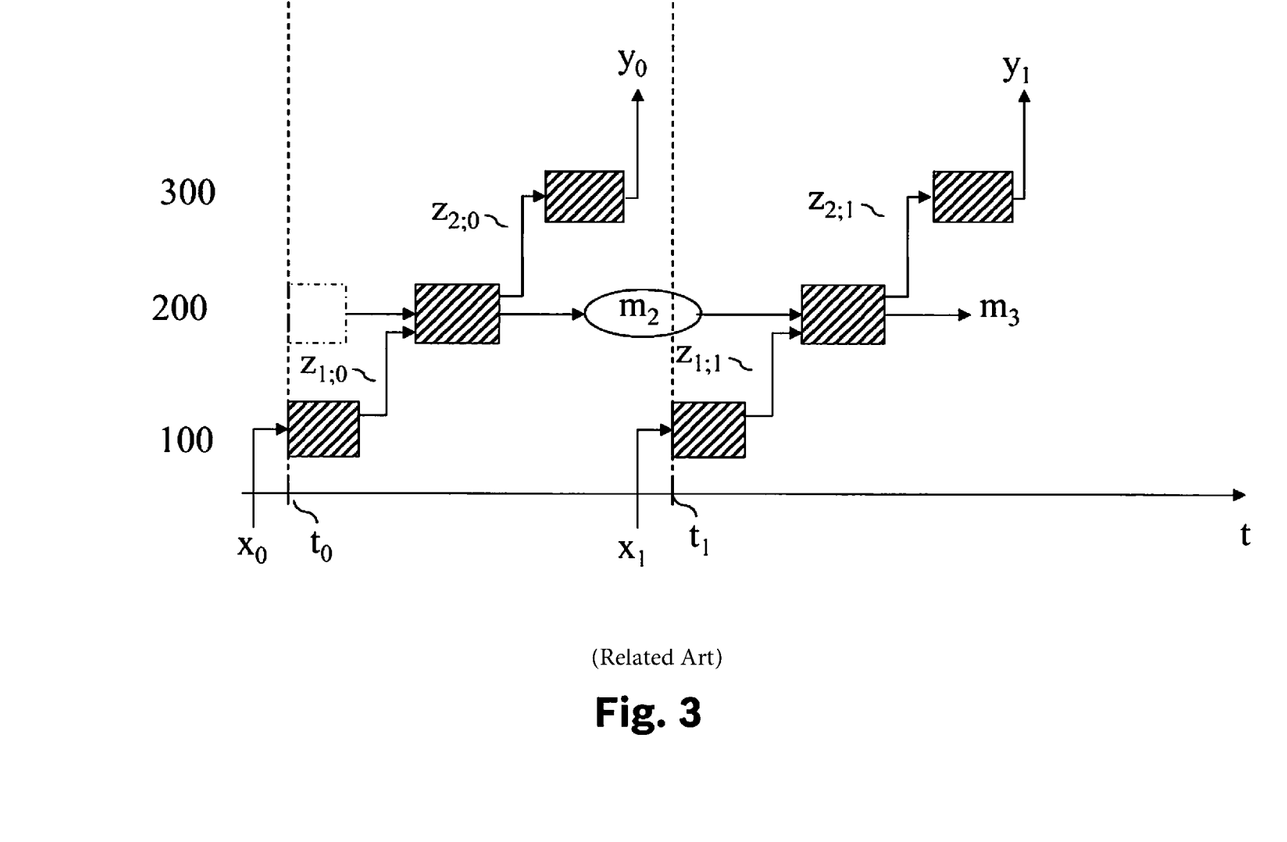
FIG. 3 schematically shows a signal propagation according to the related art through the neural network illustrated in FIG. 2.

FIG. 3 shows a time sequence of the signal propagation through neural network 60. The neural network is supplied with a sequence of input signals $x_0$, $x_1$, . . . , for example successive recordings of sensor 30. At point in time $t_0$, input layer 100 is supplied with input signal $x_0$, which is propagated through layers 100, 200, 300, signals $z_{1;0}$, $z_{2;0}$ and a first output signal $y_0$ of a sequence of output signals $y_0$, $y_1$ being ascertained in succession. When a particular one of signals $z_{1;0}$, $z_{2;0}$ has been ascertained, it is referred to as being present on subsequent layer 200, 300. Concealed layer 200 also ascertains further signal $m_2$. The initialization of further signal $m_2$ before it is first supplied to concealed layer 200 is indicated by the dashed-line box.

After output signal $y_0$ and further signal $m_2$ are ascertained, next input signal $x_1$ is supplied to input layer 100 at next point in time $t_1$, and analogously to input signal $x_0$, is propagated through the subsequent layers until next output signal $y_1$ of the sequence of output signals is ascertained.

Figure 4:
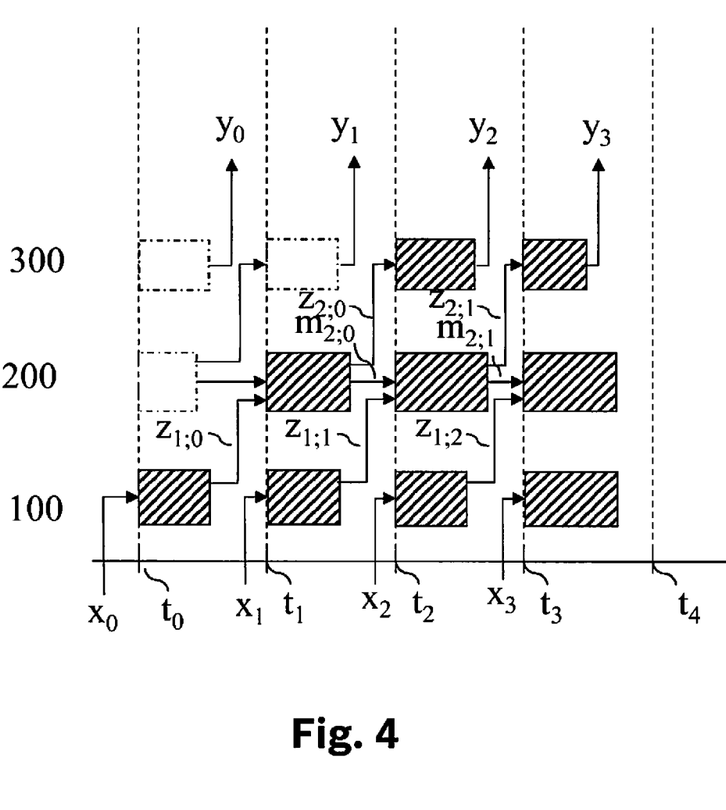
FIG. 4 schematically shows a signal propagation according to one specific embodiment of the present invention through the neural network illustrated in FIG. 2.

In contrast, FIG. 4 shows a time sequence of the signal propagation according to one specific embodiment of the present invention through neural network 60 illustrated in FIG. 2. Points in time $t_0$, $t_1$, $t_2$, $t_3$ of what may be an equidistant time grid are illustrated. At each of points in time $t_0$, $t_1$, $t_2$, $t_3$ of the equidistant time grid, input layer 100 is supplied with the respective next input variable from the sequence of input variables $x_0$, $x_1$, $x_2$, $x_3$. Concealed layer 200 and output layer 300 are initialized at point in time $t_0$, as indicated by the dashed line. A computation based on the variables present at the particular input at that moment subsequently starts simultaneously in all layers 100, 200, 300, the same as for all later points in time $t_1$, $t_2$, $t_3$, $t_4$, . . . The crosshatching indicates those layers which the propagation of input signals $x_0$, $x_1$, $x_2$, $x_3$, . . . has already reached at the particular point in time.

In one specific embodiment, the necessary computation steps in layers 100, 200, 300 are parallelized; i.e., they run simultaneously on different processing units, for example different processors or processor cores. Of course, in the computation of each of these layers 100, 200, 300, further parallelization within the particular layer is possible in each case.

Figure 5:
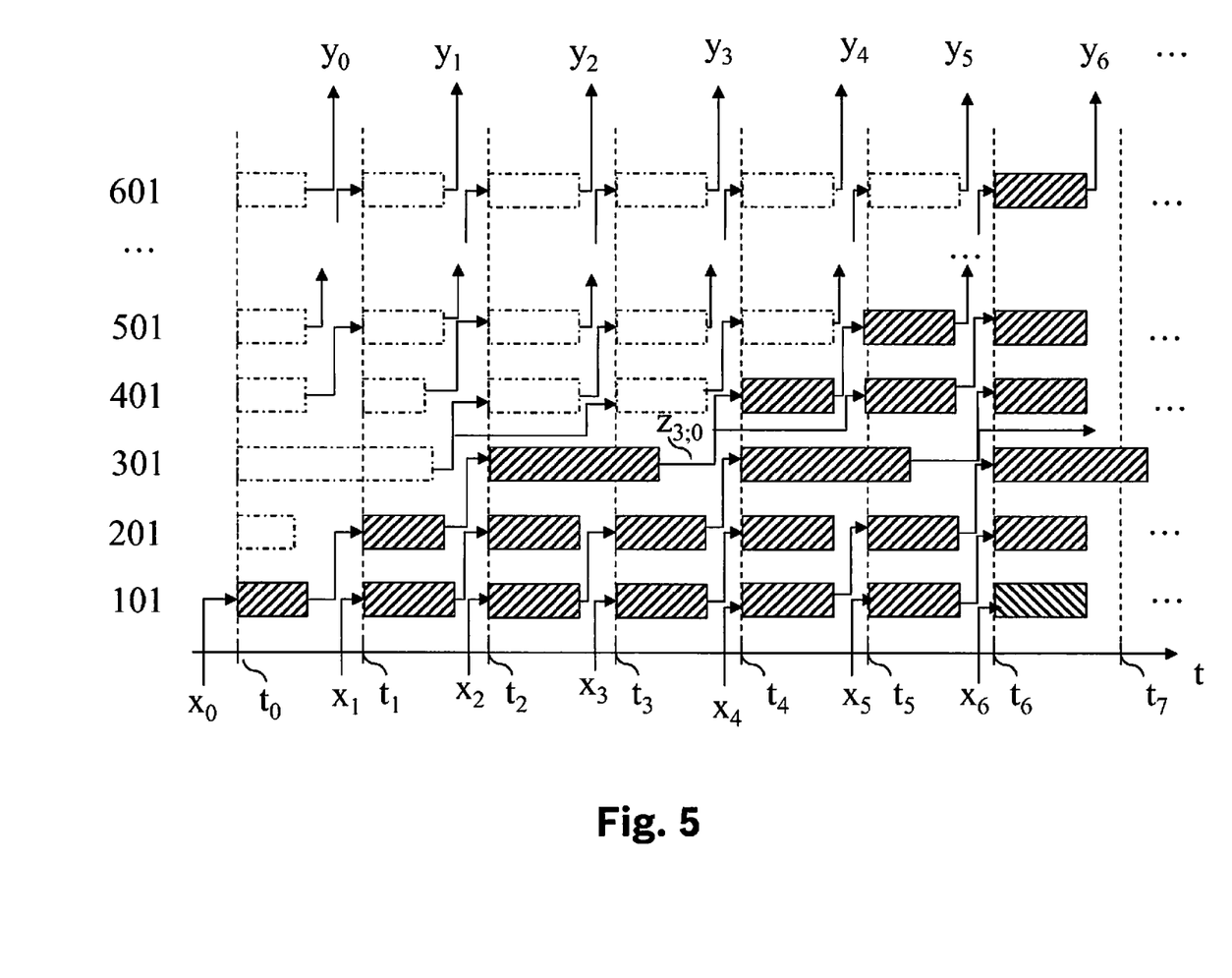
FIG. 5 schematically shows a signal propagation according to another specific embodiment of the present invention through a further neural network.

FIG. 5 shows a time sequence of the signal propagation through a strictly forward-propagating (feed-forward) network with layers 101, 201, 301, 401, 501, . . . , 601. The signal propagation is illustrated analogously to that in FIG. 4. In contrast to the specific embodiment illustrated in FIG. 4, for each of the layers a number of time pulses are predefined, each of which indicates how many time slices, situated between successive time increments, should be reserved for carrying out the computation of the particular propagation through the layer in question. In the example, this number is equal to one for layers 101, 202, 401, 501, . . . , 601, and is equal to two for layer 301.

The specific embodiment of the method is explained specifically with reference to time increments $t_2$, $t_4$, $t_6$. The propagation of input signal $x_0$ reaches third concealed layer 301 at point in time $t_2$. Layers 101, 201, 401, 501, 601, whose number assumes the value one, propagate at third point in time $t_3$, and therefore at each point in time further propagate the particular signals, present at the input at that moment, a layer farther. Third concealed layer 301 suspends the further propagation at this point in time, and only at the second next time increment (corresponding to its associated number 2) does it propagate the signal present at its input.

At point in time $t_3$, no signal that was ascertained beginning at point in time $t_2$ is present on layer 401. Therefore, the signal propagated from layer 300 with the start of propagation, beginning at point in time $t_0$, is applied to layer 401 at this point in time $t_3$ (in the example, this signal is still the initialization signal).

The same applies for point in time $t_5$, at which the signal propagated from layer 300 beginning at point in time $t_2$ is applied to layer 401. In the present architecture of the neural network, this results in input signals $x_1$, $x_3$, $x_5$ not being propagated through third layer 300. "Ignoring" of input signals would be prevented by inserting further linkages in the network, for example via a further linkage of layers 201 and 401.

Of course, the different clocking of the layers as illustrated in FIG. 5 and the recurrent layers as illustrated in FIG. 4 may be combined.

Figure 6:
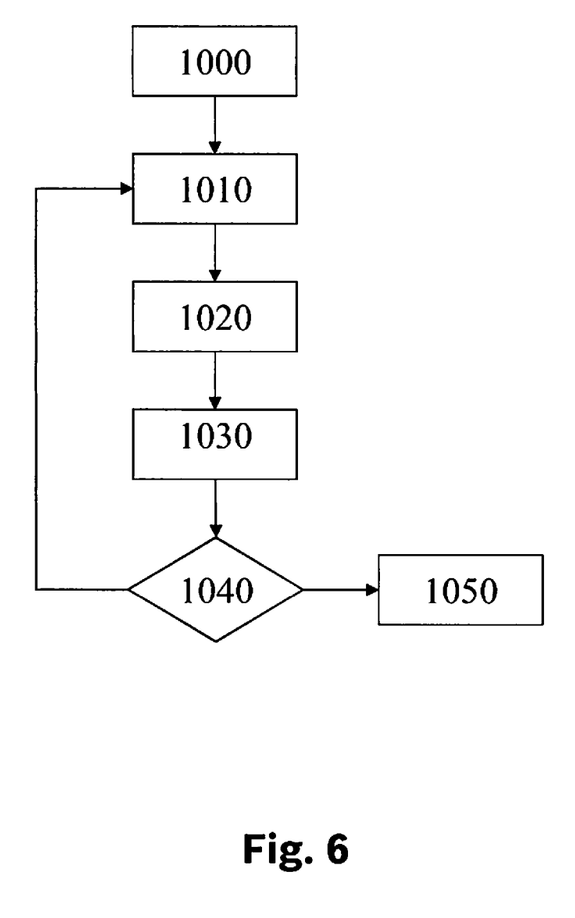
FIG. 6 shows a flow chart of one specific embodiment of the present invention.

FIG. 6 shows a flow chart for one specific embodiment of the present invention. The predefinable number of time increments is initially ascertained 1000 for each of the layers, for example read from a file, and all layers with the exception of input layer 100 are initialized. Next applied point in time $t_0$, $t_1$, $t_2$, . . . is then ascertained 1010, and with the aid of the ascertained predefinable number, those layers through which the signals present at their particular input are to be propagated at this point in time, i.e., whose corresponding computation begins at this point in time, are ascertained.

For each of these layers, a list of signals that are present at their particular inputs at this point in time is subsequently ascertained 1020. For this purpose, those layers whose outputs are connected to the inputs of the layer in question are associated with each layer. The signal of the connected preceding layer that was last marked as "completely ascertained" is selected in each case as the signal that is present at the particular input. The next input signal of the sequence of input signals is applied to input layer 100 at this point in time.

The propagation is then initiated 1030 for each of the layers ascertained in step 1010. At the conclusion of the time increment, for all layers (not just for the layers for which the propagation was initiated) it is ascertained whether a new propagation is initiated through this layer in the next time increment. If this is the case, the signal present at the output of this layer is marked as "completely ascertained."

A check is now made 1040 as to whether an abort criterion is satisfied, for example whether all input signals of the sequence of input signals are completely propagated except for output layer 300. Other abort criteria are also possible, for example whether actuator control system 40 is still operating, i.e., the method runs until the control system is switched off. This would be meaningful, for example, when the method is used in an autonomously traveling motor vehicle. If the abort condition is satisfied, the method terminates 1050. Otherwise, the method branches back to step 1010.

It is understood that the method may be carried out with any topologies of machine learning systems 60, and is not limited to the topologies illustrated in FIGS. 2, 4, and 5. In particular, arbitrary recurrent layers and connections that skip over multiple layers (so-called "skip" connections) are possible.

It is understood that the method may be implemented in software, and for example stored on a memory that is present in actuator control system 40 or measuring system 41. The method may also be implemented in hardware, or in a mixed form of software and hardware.

What is claimed is:

1. A method for ascertaining a sequence of output signals from a sequence of input signals, the ascertaining being performed using a sequence of layers of a neural network via which the sequence of input signals is supplied to the neural network and via which the sequence of output signals is output from the neural network, the method comprising:

at each point in time of a sequence of discrete points in time, supplying and input of the neural network with a respective one of the input signals of the sequence of input signals, such that:

for each respective one of the points in time of the sequence of discrete points in time after a first one of the points in time, the respective one of the input signals that is supplied to the neural network at the respective point time follows, in the sequence of input signals, the input signal that had been supplied to the neural network at the immediately preceding one of the points in time of the sequence of discrete points in time; and all of the input signals of the sequence of input signals is supplied to the neural network over an entirety of the sequence of discrete points in time; and at each respective one of at least one of the points in time of the sequence of discrete points in time at which one of the sequence of input signals is supplied to the input of the neural network, further simultaneously propagating at least one other of the signals or a respective derivative thereof present on the sequence of layers in each case to a respective subsequent layer.

2. The method of claim 1, wherein the signals present on the plurality of layers are further propagated simultaneously at the discrete points in time, the signals present on the plurality of layers each being associated with one of the input signals of the sequence of input signals.

3. The method of claim 1, wherein the sequence of layers of the neural network includes at least one recurrent layer.

4. The method of claim 1, wherein at each of the discrete points in time, respective computations tasks associated with different layers are simultaneously executed by different ones of a plurality of processing units.

5. The method of claim 1, wherein each input signal from the sequence of input signals has been ascertained with a sensor.

6. The method of claim 1, wherein an actuator is controlled as a function of the sequence of output signals.

7. The method of claim 6, wherein the actuator is a semiautonomous or autonomous robot.

8. The method of claim 6, wherein the actuator is an enabling system that is configured for enabling an activity of a device.

9. The method of claim 6, wherein the actuator is a semiautonomous or autonomous robot, which is a motor vehicle or a manufacturing robot.

10. The method of claim 1, wherein each input signal from the sequence of input signals has been ascertained with an imaging sensor.

11. The method of claim 1, wherein:
the sequence of layers includes (a) an input layer via which the sequence of input signals is supplied to the neural network, (b) an output layer via which the sequence of output signals is output from the neural network, and (c) at least one intermediate layer between the input layer and the output layer; and
at the each respective one of at least one of the points in time of the sequence of discrete points in time at which the one of the sequence of input signals is supplied to the input layer of the neural network, the further simultaneous propagation is, with respect to each of at least one of the plurality of layers, of a respective signal present on the respective layer to another of the plurality of layers that immediately follows the respective layer in the sequence of layers.

12. A method for ascertaining a sequence of output signals from a sequence of input signals using a sequence of layers of a neural network, the method comprising:
at a first point in time of a sequence of discrete points in time, supplying the neural network with a first input signal of the sequence of input signals, and subsequently, at each of the subsequent points in time of the sequence of discrete points in time, supplying the neural network with another respective one of the input signals of the sequence of input signals that, in the sequence of input signals, immediately follows the input signal that had been supplied to the neural network at the immediately preceding one of the points in time, such that all of the sequence of input signals is thereby supplied to the input layer of the neural network; and for each of one or more of the sequence of layers, further propagating, at the discrete points in time, a respective signal present on the respective layer to a respective subsequent one of the sequence of layers;
wherein at one of the discrete points in time, a signal that had been present at a prior one of the points in time is applied at an input of one of the layers of the neural network that is expecting from a preceding one of layers a signal that is not yet present.

13. A method for ascertaining a sequence of output signals from a sequence of input signals using a sequence of layers of a neural network, the method comprising:
at a first point in time of a sequence of discrete points in time, supplying the neural network with a first input signal of the sequence of input signals, and subsequently, at each of the subsequent points in time of the sequence of discrete points in time, supplying the neural network with another respective one of the input signals of the sequence of input signals that, in the sequence of input signals, immediately follows the input signal that had been supplied to the neural network at the immediately preceding one of the points in time, such that all of the sequence of input signals is thereby supplied to the input layer of the neural network; and
for each of one or more of the sequence of layers, further propagating, at the discrete points in time, a respective signal present on the respective layer to a respective subsequent one of the sequence of layers;
wherein a respective fixed number of time pulses is predefined for each of one or more of the layers within which propagation of a signal through the respective layer is completed with certainty for production of a respective layer output signal that is available at a respective output of the respective layer after the predefined number of time pulses from when the propagated signal was obtained by the respective layer.

14. The method of claim 13, wherein, for the each of the one or more of the layers, the predefined number of time pulses further defines that the respective layer output signal is present on the respective layer for the predefined number of pulses.

15. The method of claim 14, wherein each of the pulses is a period of time between a pair of successive ones of the sequence of discrete pair of the sequence of discrete points in time.

16. The method of claim 13, wherein, at one of the discrete points in time, a signal that had been present at a prior one of the points in time is applied at an input of one of the layers of the neural network that is expecting from a preceding one of layers a signal that is not yet present.

17. The method of claim 13, wherein each of the pulses is a period of time between a pair of successive ones of the sequence of discrete pair of the sequence of discrete points in time.

18. A measuring system, comprising:
at least one processor; and
at least one machine-readable memory medium one which is stored a computer program that is executable by the at least one processor, the computer program including program code for ascertaining a sequence of output signals from a sequence of input signals, the ascertaining being performed using a sequence of layers of a neural network via which the sequence of input signals is supplied to the neural network and via which the sequence of output signals is output from the neural network, by performing the following:

at each point in time of a sequence of discrete points in time, supplying the input layer of the neural network with a respective one of the input signals of the sequence of input signals, such that:
- for each respective one of the points in time of the sequence of discrete points in time after a first one of the points in time, the respective one of the input signals that is supplied to the neural network at the respective point time follows, in the sequence of input signals, the input signal that had been supplied to the neural network at the immediately preceding one of the points in time of the sequence of discrete points in time; and
- all of the input signals of the sequence of input signals is supplied to the neural network over an entirety of the sequence of discrete points in time; and at each respective one of at least one of the points in time of the sequence of discrete points in time at which one of the sequence of input signals is supplied to the input of the neural network, further simultaneously propagating at least one other of the signals or a respective derivative thereof present on the sequence of layers in each case to a respective subsequent layer.

19. An actuator control system for controlling an actuator, comprising:
- at least one processor; and
- at least one machine-readable memory medium on which is stored a computer program that is executable by the at least one processor, the computer program including program code for ascertaining a sequence of output signals from a sequence of input signals, the ascertaining being performed using a sequence of layers of a neural network via which the sequence of input signals is supplied to the neural network and via which the sequence of output signals is output from the neural network, by performing the following:
  - at each point in time of a sequence of discrete points in time, supplying the input layer of the neural network with a respective one of the input signals of the sequence of input signals, such that:
    - for each respective one of the points in time of the sequence of discrete points in time after a first one of the points in time, the respective one of the input signals that is supplied to the neural network at the respective point time follows, in the sequence of input signals, the input signal that had been supplied to the neural network at the immediately preceding one of the points in time of the sequence of discrete points in time; and
    - all of the input signals of the sequence of input signals is supplied to the neural network over an entirety of the sequence of discrete points in time; and
  - at each respective one of at least one of the points in time of the sequence of discrete points in time at which one of the sequence of input signals is supplied to the input of the neural network, further simultaneously propagating at least one other of the signals or a respective derivative thereof present on the sequence of layers in each case to a respective subsequent layer.

20. A non-transitory computer readable medium on which is stored computer program that is executable by a processor and that, when executed by the processor, causes the processor perform a method for ascertaining a sequence of output signals from a sequence of input signals, the ascertaining being performed using a sequence of layers of a neural network via which the sequence of input signals is supplied to the neural network and via which the sequence of output signals is output from the neural network, the method comprising:
- at each point in time of a sequence of discrete points in time, supplying the input layer of the neural network with a respective one of the input signals of the sequence of input signals, such that:
  - for each respective one of the points in time of the sequence of discrete points in time after a first one of the points in time, the respective one of the input signals that is supplied to the neural network at the respective point time follows, in the sequence of input signals, the input signal that had been supplied to the neural network at the immediately preceding one of the points in time of the sequence of discrete points in time; and
  - all of the input signals of the sequence of input signals is supplied to the neural network over an entirety of the sequence of discrete points in time; and
- at each respective one of at least one of the points in time of the sequence of discrete points in time at which one of the sequence of input signals is supplied to the input of the neural network, further simultaneously propagating at least one other of the signals or a respective derivative thereof present on the sequence of layers in each case to a respective subsequent layer.

21. The computer readable medium of claim 20, wherein the signals present on the sequence of layers, which are further propagated simultaneously at the discrete points in time, are each associated with one of the input signals of the sequence of input signals.

* * * * *